(12) United States Patent
Kwon et al.

(10) Patent No.: US 8,014,349 B2
(45) Date of Patent: Sep. 6, 2011

(54) APPARATUS AND METHOD FOR TRANSMITTING/RECEIVING SIGNAL IN A COMMUNICATION SYSTEM

(75) Inventors: Tae-Soo Kwon, Daejeon (KR); Chi-Hyun Park, Suwon-si (KR); Sang-Boh Yun, Seongnam-si (KR); Dong-Ho Cho, Seoul (KR); Ju-Yeop Kim, Anyang-si (KR); Ho-Won Lee, Chungju-si (KR); O-Hyun Jo, Cheongju-si (KR); Sik Choi, Daejeon (KR)

(73) Assignees: Samsung Electronics Co., Ltd (KR); Korea Advanced Institute of Science and Technology (KAIST) (KR)

( * ) Notice: Subject to any disclaimer, the term of this patent is extended or adjusted under 35 U.S.C. 154(b) by 692 days.

(21) Appl. No.: 11/442,750

(22) Filed: May 30, 2006

(65) Prior Publication Data

US 2007/0177541 A1    Aug. 2, 2007

(30) Foreign Application Priority Data

Feb. 2, 2006   (KR) .................. 10-2006-0010247

(51) Int. Cl.
*H04W 4/00*   (2009.01)
(52) U.S. Cl. .............. 370/329; 455/434; 455/452.2; 455/67.11; 455/450; 370/332; 370/338; 370/330
(58) Field of Classification Search .......... 455/450, 455/451, 452.1–452.2, 509, 510–511, 515, 455/67.11; 370/338, 330, 332
See application file for complete search history.

(56) References Cited

U.S. PATENT DOCUMENTS

| 6,724,742 | B1 | 4/2004 | Mun et al. |
| 6,771,618 | B1 | 8/2004 | Ueda |
| 2003/0045288 | A1 * | 3/2003 | Luschi et al. ............. 455/434 |
| 2005/0041618 | A1 * | 2/2005 | Wei et al. ................. 370/328 |

FOREIGN PATENT DOCUMENTS

| KR | 1020000077026 | 12/2000 |
| KR | 1020010015251 | 2/2001 |
| KR | 100519276 | 9/2005 |

OTHER PUBLICATIONS

Vehicular Technology Conference, 2005.

* cited by examiner

*Primary Examiner* — Kamran Afshar
*Assistant Examiner* — Sayed T Zewari
(74) *Attorney, Agent, or Firm* — The Farrell Law Firm, P.C.

(57) ABSTRACT

Provided is an apparatus and method for transmitting/receiving signals in a communication system. A base station allocates a quasi-dedicated control channel (QDCCH) to a first mobile station (MS), and allocates the QDCCH allocated to the first MS, to a second MS for a preset time. An MS receives a QDCCH allocated from the base station. If there is data to transmit to the base station, the MS determines whether the QDCCH is allocated to another MS different from the MS. If it is determined that the QDCCH is allocated to the MS itself, the MS transmits the data to the base station over the QDCCH.

28 Claims, 8 Drawing Sheets

APPARATUS AND METHOD FOR TRANSMITTING/RECEIVING SIGNAL IN A COMMUNICATION SYSTEM

PRIORITY

This application claims the benefit under 35 U.S.C. §119(a) of an application entitled "Apparatus and Method for Transmitting/Receiving Signal In a Communication System" filed in the Korean Intellectual Property Office on Feb. 2, 2006 and assigned Ser. No. 2006-10247, the entire contents of which are incorporated herein by reference.

BACKGROUND OF THE INVENTION

1. Field of the Invention

The present invention relates generally to an apparatus and method for transmitting/receiving signals in a communication system, and in particular, to an apparatus and method for transmitting/receiving uplink (UL) quasi-dedicated channel signals.

2. Description of the Related Art

The next generation communication system has developed into a packet service communication system. The packet service communication system, which is a system for transmitting burst packet data to a plurality of mobile stations (MSs), has been designed to be appropriate for high-capacity, high-speed data transmission. In addition, the next generation communication system is developing into an advanced system for guaranteeing mobility and Quality-of-Service (QoS) for a Broadband Wireless Access (BWA) communication system such as a wireless Local Area Network (LAN) communication system and a wireless Metropolitan Area Network (MAN) communication system, for high-capacity, high-speed data transmission, and the typical advanced communication system is an Institute of Electrical and Electronics Engineers (IEEE) 802.16e communication system.

The IEEE 802.16e communication system employs Orthogonal Frequency Division Multiplexing (OFDM)/Orthogonal Frequency Division Multiple Access (OFDMA) scheme to support broadband transmission on physical channels of the wireless MAN communication system. With reference to the diagram FIG. 1, a description will now be made of a configuration of a general IEEE 802.16e communication system.

Referring to FIG. 1, the IEEE 802.16e communication system has a multi-cell topology, i.e., has a cell 100 and a cell 150. The IEEE 802.16e communication system includes a base station (BS) 110 for managing the cell 100, a BS 140 for managing the cell 150, and a plurality of MSs 111, 113, 130, 151 and 153. Signal exchange between the BSs 110 and 140 and the MSs 111, 113, 130, 151 and 153 is achieved by OFDM/OFDMA scheme.

A description will now be made of a UL resource allocation operation of a BS in a general IEEE 802.16e communication system.

A description will first be made of the possible cases where the BS should allocate UL resources.

In a first case, in order to feed back to the MSs to which the BS provides a service Channel Quality Information (CQI) indicating a channel state of each of the MSs, the BS should allocate UL resources for the CQI feedback. The IEEE 802.16e communication system defines a CQI feedback period as a period corresponding to a multiple of an OFDM frame. Therefore, for CQI feedback, the BS allocates CQI channels (CQICHs) to the MSs on a dedicated basis at periods of a multiple of the OFDM frame.

Generally, however, the CQI feedback period for the CQI feedback is determined taking into account the coherence time corresponding to moving velocities of the MSs. Because of a difference between the moving velocities of the MSs, the IEEE 802.16e communication system, which defines the CQI feedback period as the period of a multiple of the OFDM frame for all the MSs, causes a UL resource waste due to the CQICH allocation.

In a second case, when providing particular services to the MSs, the BS should allocate UL resources for providing the particular services. Herein, the term "particular service" refers to a service that necessarily requires UL resource allocation to enable data transmission over the UL in providing the service, such as Unsolicited Grant Service (UGS), real-time Polling Service (rtPS), and extended realtime Polling Service (ertPS).

The UGS represents the service that allocates UL dedicated resources, i.e., UL dedicated sub-channels, to an MS so that it can directly transmit data through the UL resources without sending a separate UL resource allocation request, i.e., without separately transmitting a Bandwidth Request (BW-REQ) message. Generally, the UGS is appropriate for Constant Bit Rate (CBR) traffic, for which a periodic fixed data rate should be guaranteed.

The rtPS represents the service that periodically allocates UL resources for a UL resource allocation request so that an MS may request the UL resource allocation, and is appropriate for periodic UL realtime service having a variable data rate, like a video streaming service. For convenience, the UL resource for the UL resource allocation request will be referred to as "UL resource allocation request-UL resource."

The ertPS is a service appropriate for Voice over Internet Protocol (VoIP) traffic having silence suppression. The ertPS represents the service that requests UL resources in the form of piggyback in an ON interval and provides a service in the form of the rtPS in an OFF interval.

With reference to the signaling diagram of FIG. 2, a description will now be made of a UL resource allocation operation for providing the rtPS in a general IEEE 802.16e communication system.

Before a description of FIG. 2 is given, it should be noted that the rtPS, because of its characteristics, should periodically allocate UL resource allocation request-UL resources to an MS so that the MS may request UL resource allocation. In addition, the BS should allocate downlink (DL) resources using UL resource allocation information for the periodically allocated UL resource allocation request-UL resources, and poll the allocated DL resources to the MS.

Referring to FIG. 2, a BS 200, as it provides rtPS to an MS 250, allocates UL resource allocation request-UL resources to the MS 250 according to a preset polling interval, and polls UL resource allocation information for the allocated UL resource allocation request-UL resources to the MS 250. Herein, the polling interval is determined taking a delay bound of the rtPS into account. However, in the rtPS, even though its service characteristic has a variable data rate, not only the UL resource allocation request-UL resources are allocated according to the polling interval determined taking the delay bound into account, but also UL resource allocation information for the allocated UL resource allocation request-UL resources should be polled to the MS 250 through DL resources.

However, although the BS 200 allocates UL resource allocation request-UL resources according to the polling interval, the MS 250 transmits a BW-REQ message for UL resource allocation request on a burst basis at relatively long periods as shown in FIG. 2. Therefore, for the interval where the BW- REQ message is not transmitted, the UL resource allocation request-UL resources allocated to the MS 250 cannot be allocated to the other MSs being serviced by the BS 200, thus causing a waste of the UL resources and also wasting the DL resources used for polling the UL resource allocation information for the allocated UL resource allocation request-UL resources.

In particular, the IEEE 802.16e communication system transmits resource allocation information, i.e., DL resource allocation information and UL resource allocation information, to the MSs through a DL MAP message and a UL MAP message, respectively. However, because every MS should be able to receive the DL MAP message and the UL MAP message, the DL MAP message and the UL MAP message are, before being transmitted, modulated and coded according to the most robust Modulation and Coding Scheme (MCS) level among MCS levels available in the IEEE 802.16e communication system. Therefore, the transmission of the UL resource allocation information for the UL resource allocation request-UL resources to provide the rtPS causes a considerable waste of DL resources.

As described above, the current IEEE 802.16e communication system suffers a waste of UL resources due to CQICH allocation without consideration of mobility of the MSs and also suffers a waste of UL resources and DL resources for providing the rtPS. The waste of DL/UL resources results in deterioration of the entire system performance of the IEEE 802.16e communication system.

SUMMARY OF THE INVENTION

It is, therefore, an object of the present invention to provide an apparatus and method for transmitting/receiving signals in a communication system.

It is another object of the present invention to provide an apparatus and method for transmitting/receiving UL quasi-dedicated channel signals in a communication system.

It is further another object of the present invention to provide an apparatus and method for transmitting/receiving UL quasi-dedicated channel signals so as to minimize a waste of DL/UL resources in a communication system.

According to one aspect of the present invention, there is provided a base station for a communication system. The base station includes a controller for allocating a quasi-dedicated control channel (QDCCH) to a first mobile station (MS), and allocating the QDCCH allocated to the first MS, to a second MS for a preset time; and a sub-channel allocator for allocating the QDCCH to the first MS or the second MS according to a control signal from the controller.

According to another aspect of the present invention, there is provided a mobile station (MS) for a communication system. The MS includes a controller for detecting receipt of a quasi-dedicated control channel (QDCCH) allocated from a base station, if there is data to transmit to the base station, determining whether the QDCCH is allocated to another MS different from the MS, and if it is determined that the QDCCH is allocated to the MS itself, transmitting the data to the base station over the QDCCH; and a signal generator for generating a QDCCH signal for transmitting the data according to a control signal from the controller.

According to further another aspect of the present invention, there is provided a method for transmitting a signal by a base station in a communication system. The method includes allocating a quasi-dedicated control channel (QDCCH) to a first mobile station (MS); and allocating the QDCCH allocated to the first MS, to a second MS for a preset time.

According to another aspect of the present invention, there is provided a method for receiving a signal by a mobile station (MS) in a communication system. The method includes receiving a quasi-dedicated control channel (QDCCH) allocated from a base station; if there is data to transmit to the base station, determining whether the QDCCH is allocated to another MS different from the MS; and if it is determined that the QDCCH is allocated to the MS itself, transmitting the data to the base station over the QDCCH.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Figure 1:
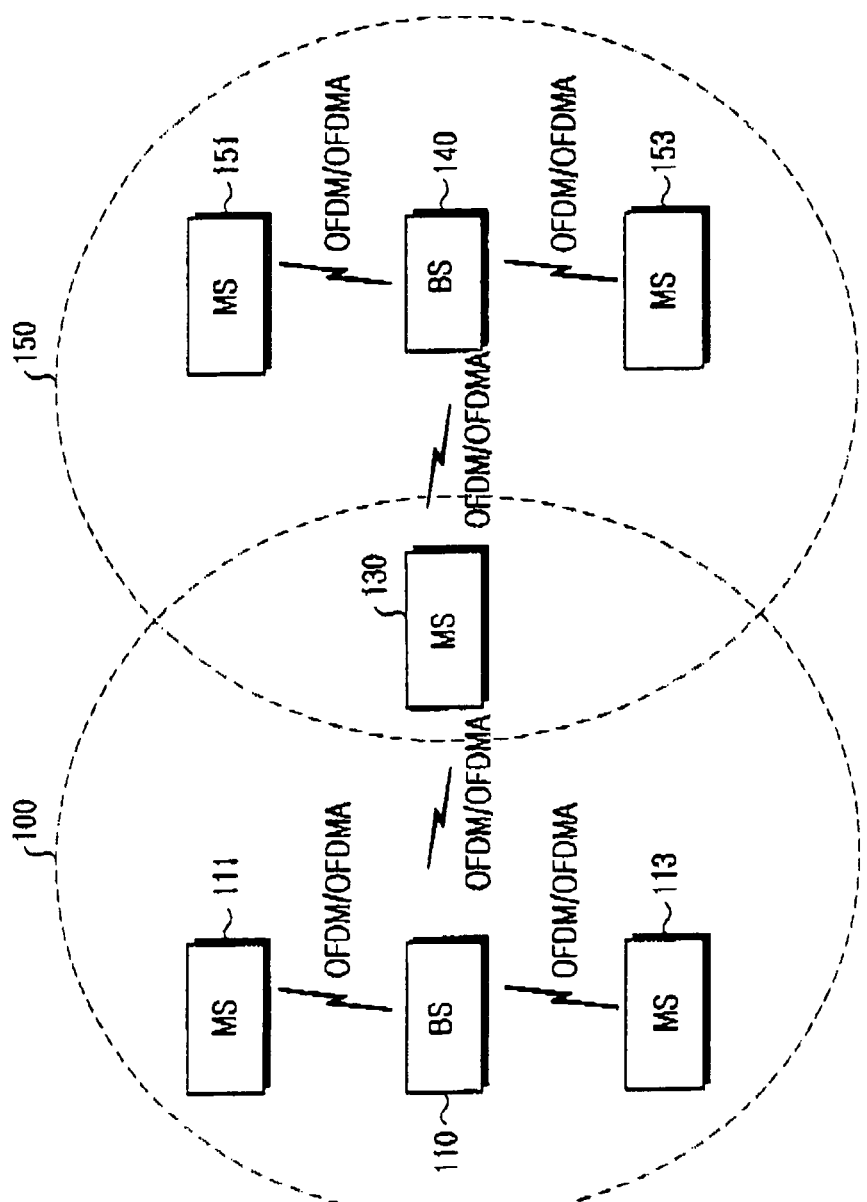
FIG. 1 is a diagram illustrating a configuration of a general IEEE 802.16e communication system.
Figure 2:
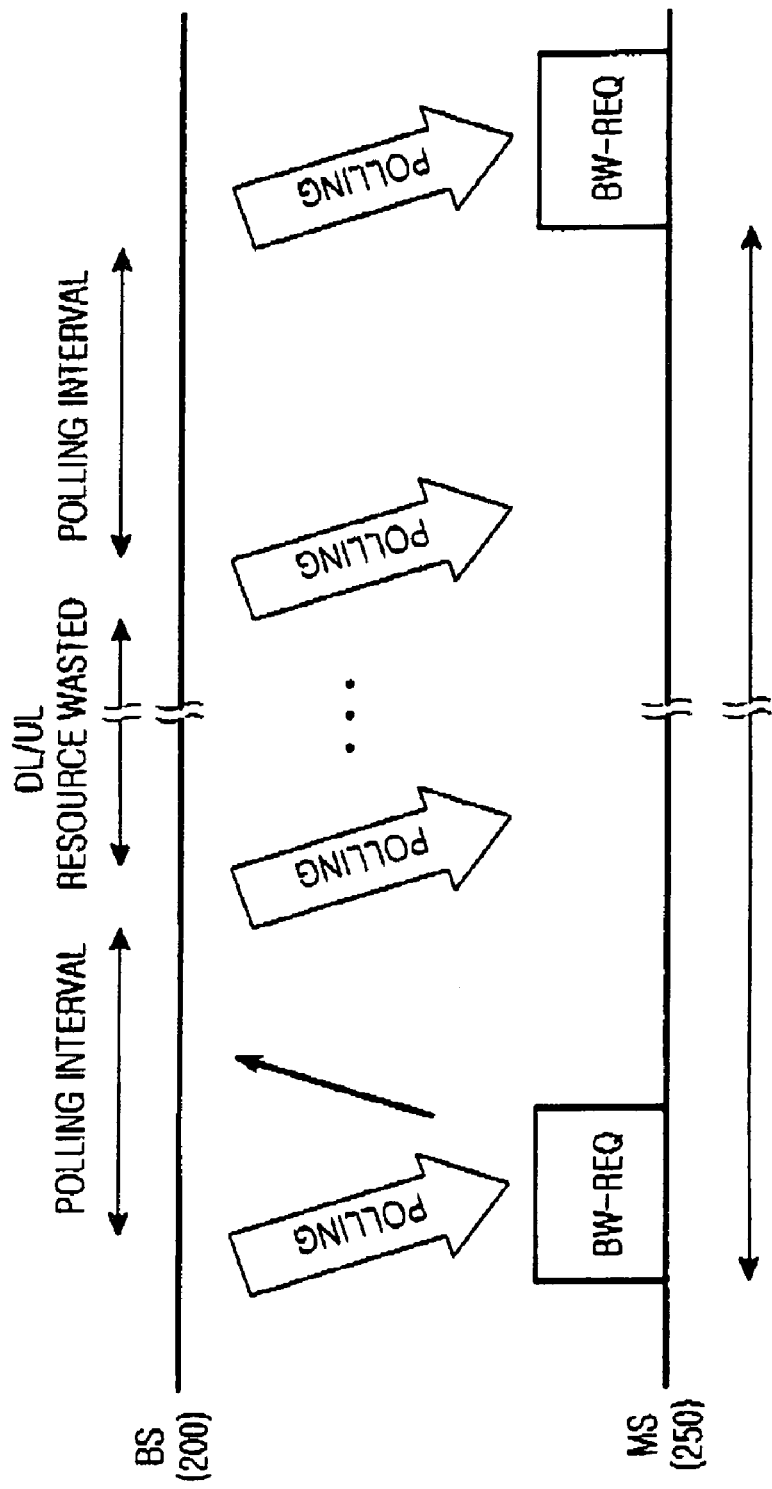
FIG. 2 is a signaling diagram illustrating a UL resource allocation operation for providing the rtPS in a general IEEE 802.16e communication system.

Preferred embodiments of the present invention will now be described in detail with reference to the annexed drawings. In the following description, a detailed description of known functions and configurations incorporated herein has been omitted for clarity and conciseness.

The present invention provides an apparatus and method for transmitting/receiving uplink (UL) quasi-dedicated channel signals in a communication system. In addition, the present invention provides an apparatus and method for transmitting/receiving UL quasi-dedicated channel signals so as to minimize a waste of UL resources and downlink (DL) resources in a communication system. Although an Institute of Electrical and Electronics Engineers (IEEE) 802.16e communication system will be used herein as an example of the communication system, the UL quasi-dedicated channel signal transmission/reception apparatus and method of the present invention can be applied not only to the IEEE 802.16e communication system but also to other communication systems.

A description will now be made of a UL quasi-dedicated channel, i.e., Quasi Dedicated Control Channel (QDCCH), provided in the present invention. Basically, the QDCCH is dedicatedly allocated to a mobile station (MS). However, when the MS does not need to use the QDCCH, the QDCCH allocated to the MS can be temporarily allocated to other MSs. That is, the QDCCH is characterized in that it is allocated to an MS on a quasi-dedicated basis. When the QDCCH is temporarily allocated to the other MSs, it is allocated as general UL resources rather than a QDCCH.

A description will now be made of the possible cases where the QDCCH is allocated.

In a first case, a Channel Quality Information Channel (CQICH) is allocated as the QDCCH.

As described above in the Related Art section, the current IEEE 802.16e communication system defines a Channel Quality Information (CQI) feedback period as a period corresponding to a multiple of an Orthogonal Frequency Division Multiplexing (OFDM) frame. Therefore, for CQI feedback, a base station (BS) dedicatedly allocates CQICHs to the MSs being serviced by the BS at periods of a multiple of the OFDM frame.

Generally, however, the CQI feedback period for the CQI feedback is determined taking into account the coherence time corresponding to moving velocities of the MSs. Because of a difference between the moving velocities of the MSs, the IEEE 802.1 6e communication system, which defines the CQI feedback period as the period of a multiple of the OFDM frame for all the MSs, causes a UL resource waste due to the CQICI allocation. Because allocating the CQICH for the CQI feedback at periods of a multiple of the OFDM frame causes the UL resource waste, the present invention allocates the CQICH as the QDCCH. When the CQICH is allocated as the QDCCH in this way, it is possible to differentiate the CQI feedback period for each of the MSs according to velocities bf the MSs, and allow other MSs to use the QDCCH during the time except for the CQI feedback period for which the MSs feed back the CQI. This prevents a waste of the UL resources, increasing efficiency of the UL resources.

In a second case, the UL resources needed by MSs to request necessary UL resource allocation while receiving particular services, i.e., the UL resources needed by the MSs to transmit a Bandwidth Request (BW-REQ) message to the BS while receiving the particular services, are allocated as the QDCCH.

As stated above, the term "particular service" refers to the service that necessarily requires UL resource allocation to enable data transmission over the UL in providing the service, such as Unsolicited Grant Service (UGS), realtime Polling Service (rtPS), and extended realtime Polling Service (ertPS).

The UGS represents the service that allocates UL dedicated resources, i.e., UL dedicated sub-channels, to an MS so that it can directly transmit data through the UL resources without sending a separate UL resource allocation request, i.e., without separately transmitting a BW-REQ message. Generally, the UGS is appropriate for Constant Bit Rate (CBR) traffic, for which a periodic fixed data rate should be guaranteed.

The rtPS represents the service that periodically allocates UL resources for a UL resource allocation request so that an MS may request the UL resource allocation, and is appropriate for periodic UL realtime service having a variable data rate, like a video streaming service. For convenience, the UL resource for the UL resource allocation request will be referred to as "UL resource allocation request-UL resource."

The ertPS is a service appropriate for Voice over Internet Protocol (VoIP) traffic having silence suppression. The ertPS represents the service that requests UL resources in the form of piggyback in an ON interval and provides a service in the form of the rtPS in an OFF interval.

Of the particular services, the rtPS, due to its service characteristic, should periodically allocate the UL resource allocation request-UL resources so that an MS may request UL resource allocation. Therefore, a BS periodically allocates UL resource allocation request-UL resources to the MS while providing the rtPS. In addition, the BS should allocate DL resources using UL resource allocation information for the periodically allocated UL resource allocation request-UL resources, and poll the allocated DL resources to the MS. That is, the BS, as it provides rtPS to the MS, allocates UL resource allocation request-UL resources to the MS according to a preset polling interval, and polls UL resource allocation information for the allocated UL resource allocation request-UL resources to the MS. Herein, the polling interval is determined taking a delay bound of the rtPS into account. However, in the rtPS, even though its service characteristic has a variable data rate, not only the UL resource allocation request-UL resources are allocated according to the polling interval determined taking the delay bound into account, but also UL resource allocation information for the allocated UL resource allocation request-UL resources should be polled to the MS through DL resources.

Therefore, when the MS receives the rtPS, the present invention allocates the UL resource allocation request-UL resources to the MS as a QDCCH according to the polling interval so that the MS may request UL resource allocation. As a result, the present invention allows other MSs to use the QDCCH during the time except for the interval in which the MS sends a request for UL resource allocation to the BS, thereby preventing the UL resource waste. In addition, the BS, as it allocates the QDCCH to the MS, does not need to poll UL resource allocation information for the allocated UL resource allocation request-UL resources to the MS through DL resources, also preventing the DL resource waste due to the polling of the UL resource allocation information for the allocated UL resource allocation request-UL resources.

As described above, the QDCCH can be temporarily used not only by the MS allocated the QDCCH, but also by the other MSs. Herein, the QDCCH can be temporarily allocated to the other MSs only within the bounds of satisfying the maximum allowable delay time of the MS allocated the QDCCH, and Quality-of-Service (QoS) of the service the MS is receiving. The condition for allowing the QDCCH to be temporarily allocated to the other MSs will be described below in detail.

With reference to the diagram of FIG. 3, a description will now be made of a UL frame structure of an IEEE 802.16e communication system according to of the present invention.

Figure 3:
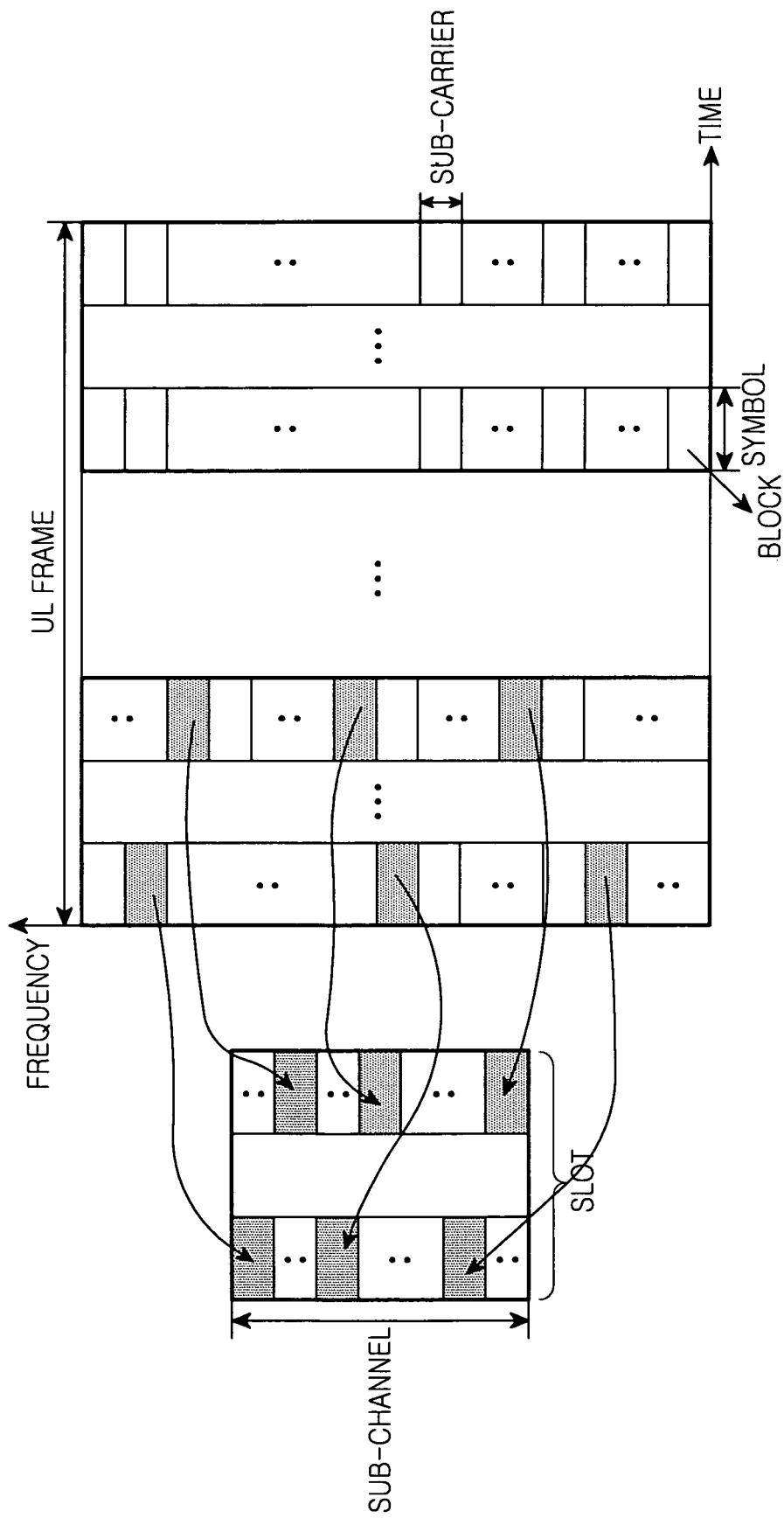
FIG. 3 is a diagram illustrating a UL frame structure of an IEEE 802.16e communication system according to the present invention.

Before a description of FIG. 3 is given, it should be noted that although the IEEE 802.16e communication system divides its operation mode into an Adaptive Modulation and Coding (AMC) mode and a diversity mode, FIG. 3 shows a UL frame structure for the case where the IEEE 802.16e communication system uses the diversity mode, by way of example. Alternatively, the QDCCH signal transmission/reception apparatus and method of the present invention can also be applied to the IEEE 802.16e communication system that uses the AMC mode rather than the diversity mode.

A detailed description will now be made of a structure of a QDCCH proposed in the present invention, shown in FIG. 3.

One QDCCH includes a plurality of blocks, for example 48 blocks, a time domain occupied by the one QDCCH is one slot, and a frequency domain occupied by the one QDCCH is one sub-channel. Herein, a time domain occupied by one block is one symbol, i.e., one OFDM symbol, and a frequency domain occupied by one block is one sub-carrier.

The present invention may use some of the total UL resources of the IEEE 802.16e communication system for the QDCCH allocation. Alternatively, the present invention may use all of the total UL resources for the QDCCH allocation. Although the QDCCH is used herein for transmission of the CQI feedback and the UL resource allocation request, by way of example, the QDCCH can be used not only for the transmission of the CQI feedback and the UL resource allocation request, but also for transmission of other control messages, for example, a handover request message.

Figure 4:
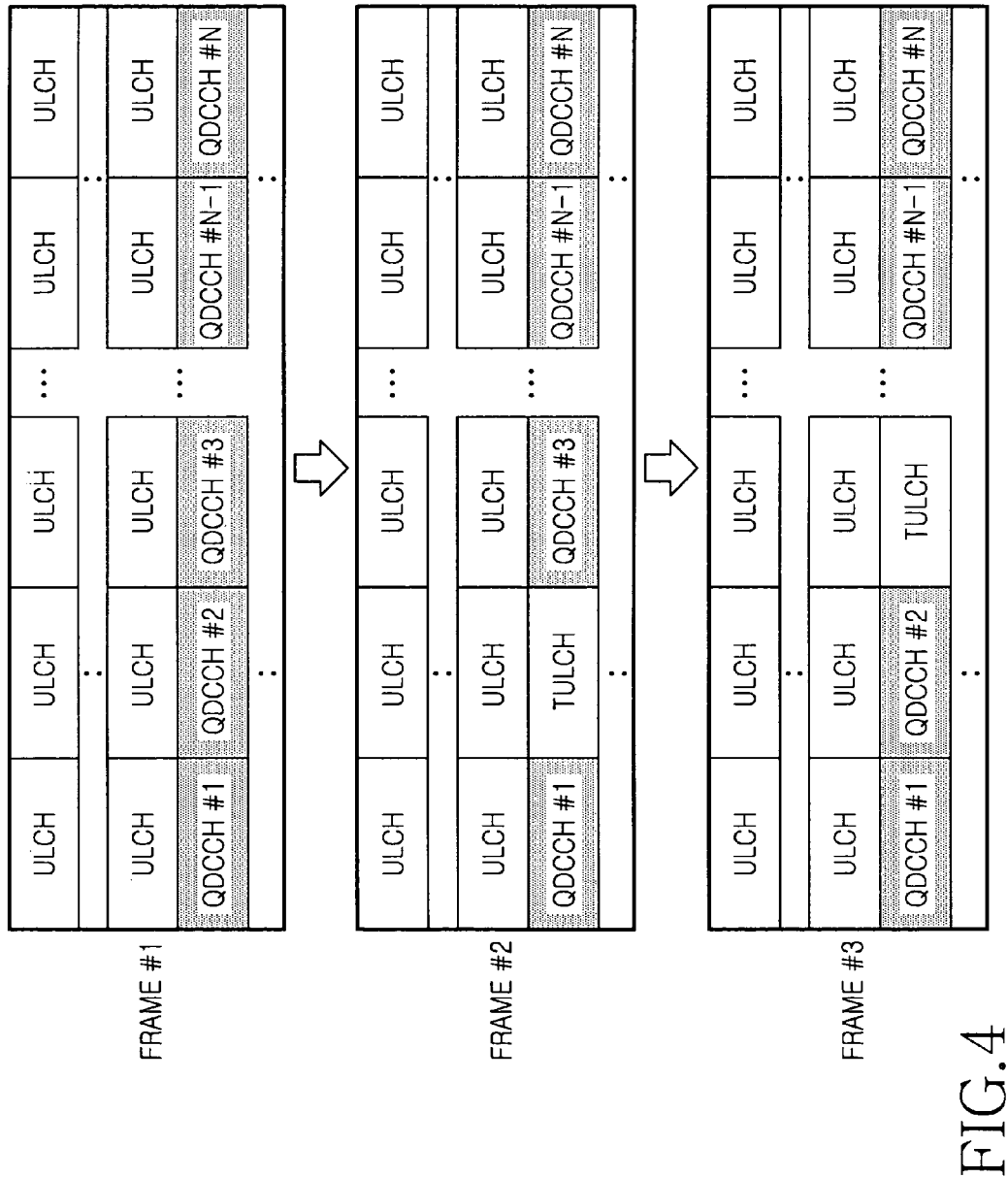
FIG. 4 is a diagram illustrating an operation of temporarily allocating the QDCCHs allocated to particular MSs, to other MSs in an IEEE 802.16e communication system according to the present invention.

FIG. 4 is a diagram illustrating an operation of temporarily allocating the QDCCHs presently allocated to particular MSs, to other MSs in an IEEE 802.16e communication system according to the present invention.

Before a description of FIG. 4 is given, it should be noted that as described above, when the QDCCH is temporarily allocated to the other MSs, it is allocated as general UL resources rather than a QDCCH.

Referring to FIG. 4, it will be assumed in a first frame #1 that all of N QDCCHs of QDCCH #1 to QDCCH #N are all used as a QDCCH. The UL resources except for the UL resources allocated as the N QDCCHs are used as general UL resources, i.e., UL channels (ULCHs). Although it is shown in FIG. 4 that the N QDCCHs and the ULCHs are equal to each other in size, i.e., in their occupied time domains and frequency domains, the N QDCCHs and the ULCHs may also be different from each other in size.

Next, it will be assumed in a second frame #2 that of the N QDCCHs, one QDCCH of QDCCH #2 is temporarily allocated to another MS as a ULCH. When one of the QDCCHs is temporarily allocated to another MS as a ULCH in this way, the QDCCH temporarily allocated as the ULCH will be referred to as a temporary ULCH (TULCH). In addition, it will be assumed in a third frame #3 that of the N QDCCHs, one QDCCH of QDCCH #3 is temporarily allocated to another MS as a TULCH. As described above, the QDCCH can be allocated as the TULCH only within the bounds of satisfying the maximum allowable delay time of the MS allocated the QDCCH, and QoS of the service the MS is receiving.

Figure 5:
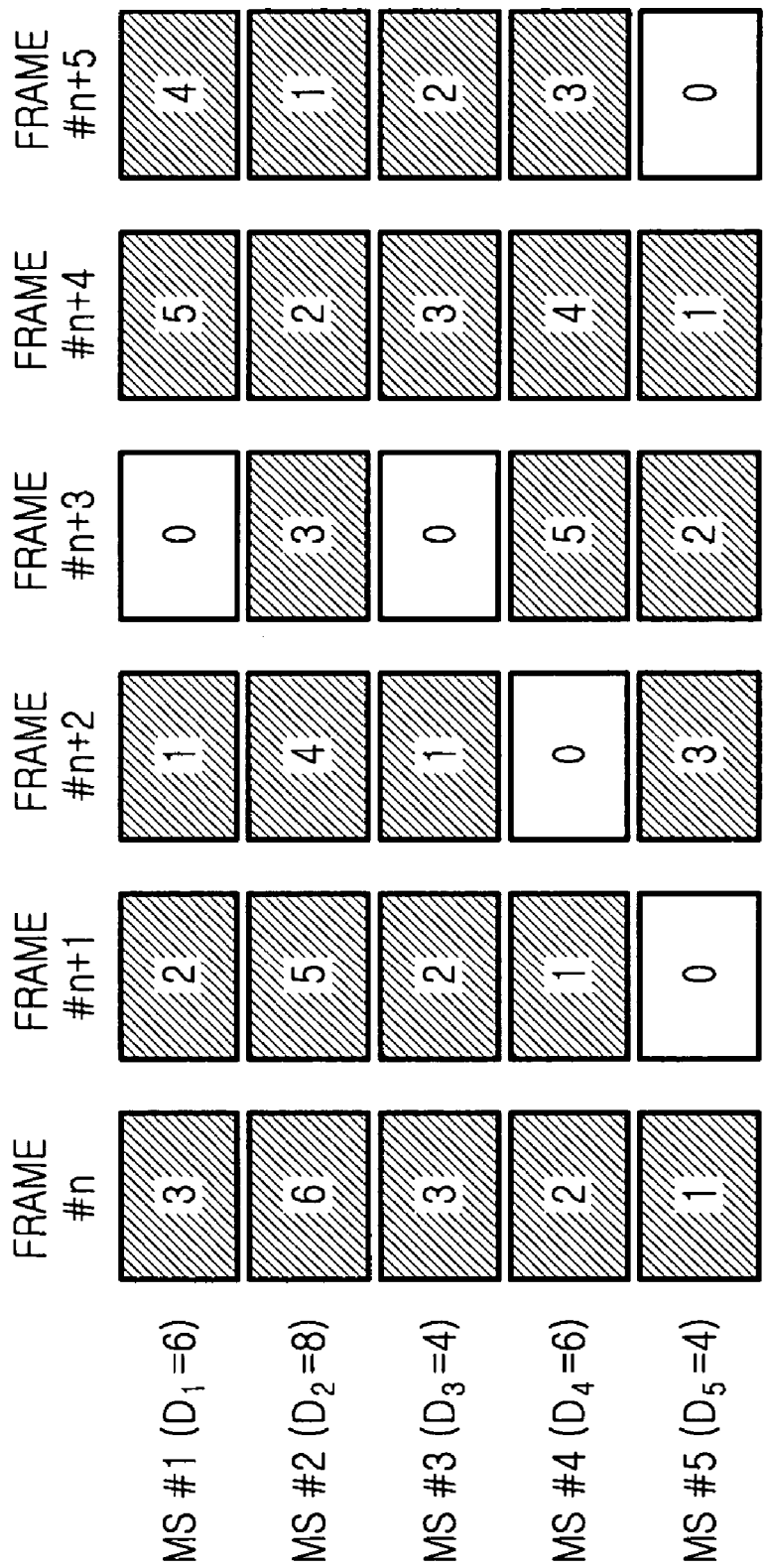
FIG. 5 is a diagram illustrating an operation for the case where the number of QDCCHs usable as TULCHs among the total QDCCHs is set to the maximum allowable number in an IEEE 802.16e communication system according to the present invention.

FIG. 5 is a diagram illustrating an operation for the case where the number of QDCCHs usable as TULCHs among the total QDCCHs is set to the maximum allowable number in an IEEE 802.16e communication system according to the present invention.

Before a description of FIG. 5 is given, if it is assumed that the total number of QDCCHs allocated by a BS is Q and the average number of QDCCHs used as TULCHs among the Q QDCCHs is $S_{av}$, then $$S_{av} \geq Q \cdot S_{av} \quad (1)$$

One MS can have a plurality of sessions. Even though one MS has a plurality of sessions in this way, one MS is allocated only one QDCCH. In this case, an access delay bound of the MS is set to an access delay bound of the session having the minimum access delay bound among the plurality of sessions. Assuming that the minimum access delay bound needed for a particular MS #i includes $D_i$ frames, the BS should not allocate the QDCCH allocated to the MS #i as a TULCH during $D_i$ consecutive frames. That is, the BS defines a required access delay bound parameter $\bar{d}^{(i)}$ of each MS, the required access delay bound parameter $\bar{d}^{(i)}$ should necessarily be kept as a non-negative value, and QDCCHs allocated to the MSs with the required access delay bound parameter $\bar{d}^{(i)}$=zero (0) should not be allocated as the TULCHs.

The maximum number $S_{max}$ of the QDCCHs usable as the TULCHs is determined by Equation (2):

$$S_{max} = \sum_{i=1}^{Q} \frac{D_i - 1}{D_i} \quad (2)$$

(We revised the capital "I" to the small letter, i in dominator, $D_I$ in Equation 2.

Referring to FIG. 5, the QDCCHs allocated to the MSs with the required access delay bound parameter $\bar{d}$=non-negative value can be allocated as TULCHs anytime. That is, for $S_{av}=S_{max}$, the QDCCHs allocated to the MSs with the required access delay bound parameter $\bar{d}$=non-negative value can be allocated as TULCHs anytime. In FIG. 5, the hatched QDCCHs represent QDCCHs usable as TULCHs, and the non-hatched QDCCHs represent QDCCHs unusable as TULCHs.

Figure 6:
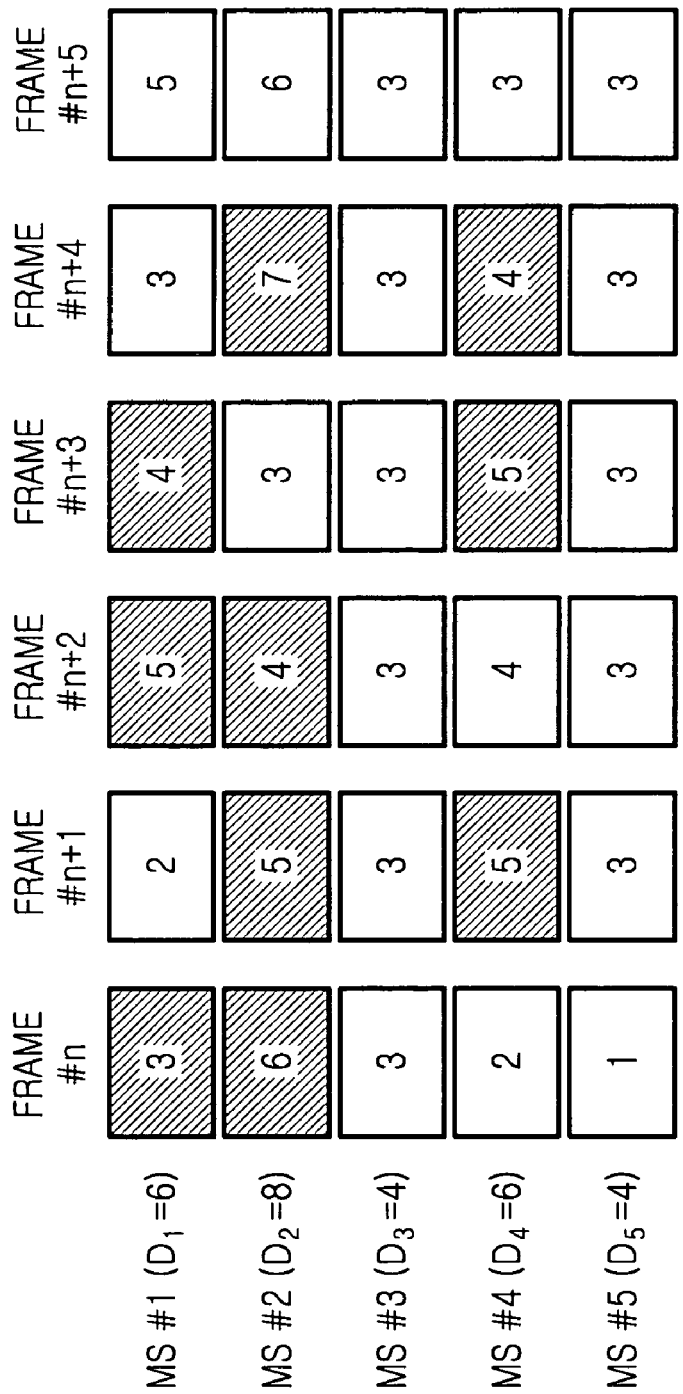
FIG. 6 is a diagram illustrating an operation for the case where the number of QDCCHs usable as TULCHs among the total QDCCHs is set smaller than the maximum allowable number in an IEEE 802.16e communication system according to the present invention.

FIG. 6 is a diagram illustrating an operation for the case where the number of QDCCHs usable as TULCHs among the total QDCCHs is set smaller than the maximum allowable number in an IEEE 802.16e communication system according to the present invention.

Referring to FIG. 6, for $S_{av}<S_{max}$, $S_{av}$ QDCCHs can be allocated as TULCHs in descending order of the required access delay bound parameter $\bar{d}$. That is, a ratio of the QDCCHs allocable as TULCHs to the total QDCCHs is proportional to the required access delay bound parameter $\bar{d}$. Also, in FIG. 6, the hatched QDCCHs represent QDCCHs usable as TULCHs, and the non-hatched QDCCHs represent QDCCHs unusable as TULCHs.

Figure 7:
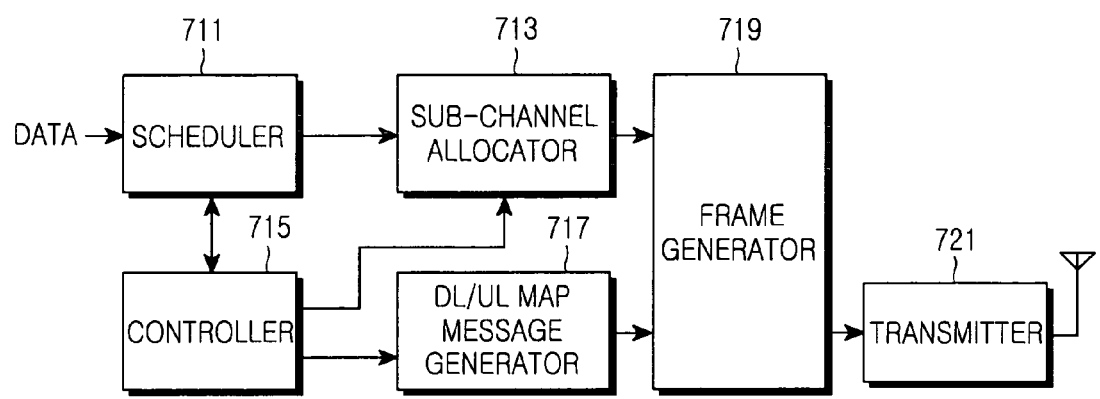
FIG. 7 is a diagram illustrating an internal BS structure of an IEEE 802.16e communication system according to the present invention.

FIG. 7 is a diagram illustrating an internal BS structure of an IEEE 802.16e communication system according to the present invention.

Referring to FIG. 7, the BS includes a scheduler 711, a sub-channel allocator 713, a controller 715, a DL/UL MAP message generator 717, a frame generator 719, and a transmitter 721.

The controller 715 controls sub-channel allocation for the BS such that a corresponding QDCCH can be allocated as a TULCH only in the bound satisfying the maximum allowable delay time of the MSs allocated QDCCHs and QoS of the service the MSs are receiving. The QDCCH allocation and the TULCH allocation have been described above in detail, so a detailed description thereof will be omitted herein. The controller 715 controls sub-channel allocation not only for the QDCCHs and the TULCHs, but also for the general ULCHs. Herein, the controller 715 determines whether to allocate QDCCHs to the MSs when performing a network entry operation between the MSs and the BS. Because the controller 715 can identify the services the MSs will receive, when performing the network entry operation between the BS and the MSs, the controller 715 can determine whether to allocate the QDCCHs to the MSs according to the service characteristics.

Thereafter, if there is data to transmit to the MSs, the controller 715 performs a scheduling operation on the data by controlling the scheduler 711. The scheduler 711 performs scheduling on the data, using any selected one of a Maximum Carrier-to-Interference ratio (Max C/I) scheme, a Maximum Fairness (MF) scheme, and a Proportional Fairness (PF) scheme, as a scheduling scheme. The scheduler 711 outputs the scheduling result to the sub-channel allocator 713 and the controller 715.

Further, the controller 715 determines sub-channels, i.e., QDCCHs and TULCHs, to be allocated to the MSs according to the scheduling result. The controller 715 outputs information on the sub-channels determined to be allocated to the MSs, to the DL/UL MAP message generator 717. In addition, the controller 715 allocates sub-channels for the data according to the information on the sub-channels determined to be allocated to the MSs by controlling the sub-channel allocator 713.

The sub-channel allocator 713 allocates sub-channels according to the scheduled data output from the scheduler 711 and the information output from the controller 715, and outputs the allocated sub-channels to the frame generator 719. The DU/UL MAP message generator 717 generates a DL MAP message and a UL MAP message according to the QDCCH allocation information, the TULCH allocation information and the ULCH allocation information, output from the controller 715, and outputs the generated DL/UL MAP messages to the frame generator 719.

The frame generator 719 generates a frame signal using the sub-channel signal output from the sub-channel allocator 713, the DL/UL MAP messages output from the DL/UL MAP message generator 717, a preamble signal (not shown), and an FCH (Frame Control Header) (not shown), and outputs the generated frame signal to the transmitter 721. The transmitter 721 performs a radio process on the frame signal output from the frame generator 719, and transmits the radio-processed signal via an antenna.

Figure 8:
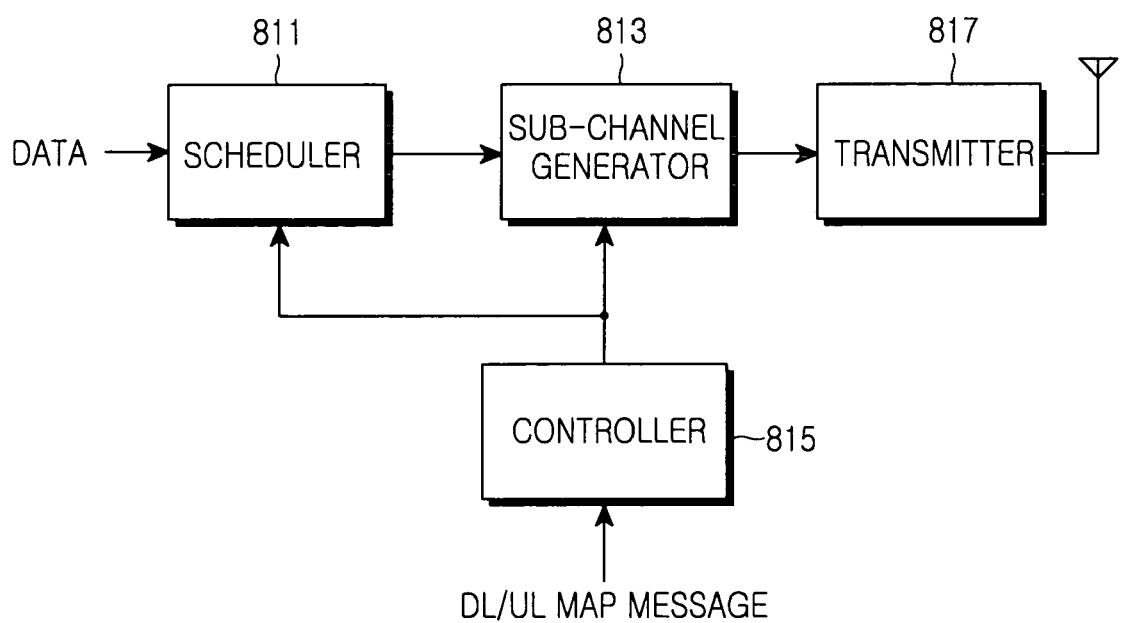
FIG. 8 is a diagram illustrating an internal MS structure of an IEEE 802.16e communication system according to the present invention.

FIG. 8 is a diagram illustrating an internal MS structure of an IEEE 802.16e communication system according to an embodiment of the present invention.

Referring to FIG. 8, the MS includes a scheduler 811, a sub-channel generator 813, a controller 815, and a transmitter 817.

If there is data to transmit to a BS, i.e., if there is a UL resource allocation request or a BW-REQ message, the generated data is delivered to the scheduler 811. The scheduler 811 performs a scheduling operation on the data under the control of the controller 815. The scheduler 811 performs scheduling on the data using any selected one of the Max C/I scheme, the MF scheme, and the PF scheme, as a scheduling scheme. The scheduler 811 outputs the scheduling result to the sub-channel generator 813 and the controller 815.

The controller 815 controls the sub-channel generator 813 to generate a sub-channel signal taking into account the scheduling result depending on the DL/UL MAP messages transmitted from the BS. Even though the MS is allocated a QDCCH, the QDCCH allocated to the MS can be allocated to other MSs as a TULCH. Therefore, the controller 815 constantly monitors whether to allocate the QDCCH. If there is allocation information for the QDCCH included in the UL MAP message, the controller 815 determines that the QDCCH allocated to the MS is allocated to other MSs as a TULCH. Of course, the controller 815 can be informed that the QDCCH allocated to the MS is allocated to other MSs as a TULCH, not only through the UL MAP message but also through a separate control message. Herein, the sub-channel signal is a QDCCH signal when the MS is allocated the QDCCH, and the sub-channel signal is a TULCH signal or a ULCH signal when the MS is allocated a TULCH or a ULCH. The sub-channel generator 813 generates the sub-channel signal under the control of the controller 815, and outputs the generated sub-channel signal to the transmitter 817. The transmitter 817 performs a radio process on the sub-channel signal output from the sub-channel generator 813, and transmits the radio-processed signal via an antenna.

As can be understood from the foregoing description, the communication system according to the present invention allocates a QDCCH as a CQICH, making it possible to allocate the CQICH taking mobility of an MS into consideration, thereby preventing a UL resource waste. In addition, the communication system uses the QDCCH as UL resources for providing particular services such as the rtPS, making it possible to allocate UL/DL resources according to characteristics of the burst data, thereby preventing a waste of the UL/DL resources. As a result, the present invention minimizes the UL/DL resource waste, contributing to an improvement in the entire system performance of the communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a signal by a base station (BS) in a communication system, the method comprising:

allocating a quasi-dedicated control channel (QDCCH) to a first mobile station (MS);

temporarily allocating the QDCCH as a temporary uplink channel (TULCH), to a second MS for a preset time, when the first MS does not need to use the QDCCH, and after temporarily allocating the QDCCH to the second MS, transmitting information indicating the allocation of the QDCCH to the second MS, to the first MS and the second MS, wherein the preset time is set within a bound satisfying at least one of a maximum allowable delay time of the first MS and a quality-of-service (QoS) of a service received by the first MS, wherein the QDCCH is used for one of Channel Quality Information Channel (CQICH) allocation and uplink resource allocation for at least one service to require data transmission over an uplink, wherein the preset time excludes a Channel Quality Information (CQI) feedback period for which the first MS feeds back CQI, if the QDCCH is used to the CQICH allocation, and the preset time excludes an interval in which the first MS transmits a request for the uplink resources allocation to the BS, if the QDCCH is used to the uplink resources allocation, and wherein a maximum number of QDDCHs allocable as the TULCH is determined based on a total number of QDCCHs allocated by the BS and a session access delay value of each MS, which receiving service from the BS.

2. The method of claim 1, wherein the at least one service includes at least one of Unsolicited Grant Service (UGS), realtime Polling Service (rtPS), and extended realtime Polling Service (ertPS).

3. A method for receiving a signal by a first mobile station (MS) in a communication system, the method comprising:

receiving a quasi-dedicated control channel (QDCCH) allocation from a base station (BS);

if there is data to transmit to the BS, determining whether the QDCCH is allocated as a temporary uplink channel (TULCH), to another MS different from the first MS; and if it is determined that the QDCCH is allocated to the first MS itself, transmitting the data to the base station using the QDCCH, wherein the QDCCH is temporarily allocated to the another MS for a preset time when the first MS does not need to use the QDCCH, wherein the preset time is set within a bound satisfying at least one of a maximum allowable delay time of the first MS and a quality-of-service (QoS) of a service received by the first MS, wherein the QDCCH is used for one of Channel Quality Information Channel (CQICH) allocation and uplink resource allocation for at least one service to require data transmission over an uplink, wherein the preset time excludes a Channel Quality Information (CQI) feedback period for which the MS feeds back CQI, if the QDCCH is used to the CQICH allocation, and the preset excludes an interval in which the MS transmits a request for the uplink resources allocation to the BS, if QDCCH is used to the uplink resources allocation, wherein the step of determining whether the ODCCH is allocated to another MS comprises determining that the QDCCH is allocated to the another MS, when information indicating that the ODCCH is allocated to the another MS is received from the BS, and wherein a maximum number of QDDCHs allocable as the TULCH is determined based on a total number of ODCCHs allocated by the BS and a session access delay value of each MS, which receiving service from the BS.

4. The method of claim 3, further comprising, if it is determined that the QDCCH is allocated to the another MS, transmitting the data to the BS using the QDCCH for a next transmission interval.

5. The method of claim 3, wherein the at least one service includes at least one of Unsolicited Grant Service (UGS), realtime Polling Service (rtPS), and extended realtime Polling Service (ertPS).

6. A base station (BS) for a communication system, the base station comprising:

a controller for allocating a quasi-dedicated control channel (QDCCH) to a first mobile station (MS), and temporarily allocating the QDCCH as a temporary uplink channel (TULCH), to a second MS for a preset time when the first MS does not need to use the QDUCH;

a sub-channel allocator for temporarily allocating the QDCCH to one of the first MS and the second MS according to a control signal from the controller; and a transmitter for transmitting information indicating the allocation of the QDCCH to the second MS, to the first MS and the second MS, after temporarily allocating the QDCCH to the second MS, wherein the preset time is set within a bound satisfying at least one of a maximum allowable delay time of the first MS and a quality-of-service (QoS) of a service received by the first MS, wherein the QDCCH is used for one of Channel Quality Information Channel (CQICH) allocation and uplink resource allocation for at least one service to require data transmission over an uplink, wherein the preset time excludes a Channel Quality Information (CQI) feedback period for which the first MS feeds back CQI, if the QDCCH is used to the CQICH allocation, and the preset time excludes an interval in which the first MS transmits a request for the uplink resources allocation to the BS, if the QDCCH is used to the uplink resources allocation, and wherein a maximum number of QDDCHs allocable as the TULCH is determined based on a total number of ODCCHs allocated by the BS and a session access delay value of each MS, which receiving service from the BS.

7. The BS of claim 6, wherein the at least one service includes at least one of Unsolicited Grant Service (UGS), realtime Polling Service (rtPS), and extended realtime Polling Service (ertPS).

8. The BS of claim 7, further comprising a transmitter for transmitting a QDCCH signal to one of the first and second MSs, and transmitting the information to the first and second MSs.

9. A mobile station (MS) for a communication system, the MS comprising:

a controller for detecting information about a quasi-dedicated control channel (QDCCH) allocated from a base station (BS), if there is data to transmit to the BS, determining whether the QDCCH is allocated as a temporary uplink channel (TULCH), to another MS different from the MS, and if it is determined that the QDCCH is allocated to the MS itself, transmitting the data to the BS using the QDCCH; and a signal generator for generating a QDCCH signal for transmitting the data according to a control signal from the controller, wherein the QDCCH is temporarily allocated to the another MS for a preset time when the MS does not need to use the QDCCH, wherein the preset time is set within a bound satisfying at least one of a maximum allowable delay time of the MS and a quality-of-service (QoS) of a service received by the MS, and wherein the QDCCH is used for one of Channel Quality Information Channel (CQICH) allocation and uplink resource allocation for at least one service to require data transmission over an uplink, and wherein the preset time excludes a Channel Quality Information (CQI) feedback period for which the MS feeds back CQI, when the QDCCH is used to the CQICH allocation, and the preset time excludes an interval in which the MS transmits a request for the uplink resources allocation to the BS, when QDCCH is used for the uplink resources allocation, wherein the controller determines that the QDCCH is allocated to the another MS, when information indicating that the QDCCH is allocated to the another MS is received from the BS, and wherein a maximum number of QDDCHs allocable as the TULCH is determined based on a total number of QDCCHs allocated by the BS and a session access delay value of each MS, which receiving service from the BS.

10. The MS of claim 9, wherein if it is determined that the QDCCH is allocated to the another MS, the controller transmits the data to the BS using the QDCCH for a next transmission interval.

11. The MS of claim 9, wherein the at least one service includes at least one of Unsolicited Grant Service (UGS), realtime Polling Service (rtPS), and extended realtime Polling Service (ertPS).

12. The MS of claim 9, further comprising a transmitter for transmitting the QDCCH signal.

13. The method of claim 1, wherein the QDCCH and the TULCH are determined according to a scheduling result of data.

14. The method of claim 3, further comprising determining the QDCCH and the TULCH according to a scheduling result of the data.

15. The base station of claim 6, wherein the QDCCH and the TULCH are determined according to a scheduling result of data.

16. The MS of claim 9, wherein the QDCCH and the TULCH are determined according to a scheduling result of the data.

17. The method of claim 1, wherein the QDCCH is temporarily allocates to the second MS after frames according to a session access delay value of the first MS.

18. The method of claim 17, wherein the QDCCH is temporarily allocates to the second MS, if the session access delay value of the first MS is only a value greater than or equal to one.

19. The method of claim 1, wherein the maximum number of QDDCHs allocable as the TULCH is determined by $$S_{max} = \sum_{i=1}^{Q} \frac{D_i - 1}{D_i}$$

where $S_{max}$ represents the maximum number of QDDCHs, Q represents the total number of QDCCHs allocated by the BS, $D_i$ represents a session access delay value of $i^{th}$ MS.

20. The method of claim 3, wherein the QDCCH is temporarily allocates to the another MS after frames according to a session access delay value of the first MS.

21. The method of claim 20, wherein the QDCCH is temporarily allocates to the another MS, if the session access delay value of the first MS is only a value greater than or equal to one.

22. The method of claim 3, wherein the maximum number of QDDCHs allocable as the TULCH is determined by $$S_{max} = \sum_{i=1}^{Q} \frac{D_i - 1}{D_i}$$

where $S_{max}$ represents the maximum number of QDDCHs, Q represents the total number of QDCCHs allocated by the BS, $D_i$ represents a session access delay value of $i^{th}$ MS.

23. The BS of claim 6, wherein the QDCCH is temporarily allocates to the second MS after frames according to a session access delay value of the first MS.

24. The BS of claim 23, wherein the QDCCH is temporarily allocates to the second MS, if the session access delay value is only a value greater than or equal to one.

25. The BS of claim 6, wherein the maximum number of QDDCHs allocable as the TULCH is determined by $$S_{max} = \sum_{i=1}^{Q} \frac{D_i - 1}{D_i}$$

where $S_{max}$ represents the maximum number of QDDCHs, Q represents the total number of QDCCHs allocated by the BS, $D_i$ represents a session access delay value of $i^{th}$ MS.

26. The MS of claim 9, wherein the QDCCH is temporarily allocates to the another MS after frames according to a session access delay value of the MS.

27. The MS of claim 26, wherein the QDCCH is temporarily allocates to the another MS, if the session access delay value of the MS is only a value greater than or equal to one.

28. The MS of claim 9, wherein the maximum number of QDDCHs allocable as the TULCH is determined by $$S_{max} = \sum_{i=1}^{Q} \frac{D_i - 1}{D_i}$$

where $S_{max}$ represents the maximum number of QDDCHs, Q represents the total number of QDCCHs allocated by the BS, $D_i$ represents a session access delay value of $i^{th}$ MS.

* * * * *